United States Patent
Amemiya et al.

(10) Patent No.: US 9,035,599 B2
(45) Date of Patent: May 19, 2015

(54) CHARGE CONTROL CIRCUIT, CHARGE CIRCUIT, AND MOBILE ELECTRONIC DEVICE

(71) Applicant: Semiconductor Components Industries, LLC, Phoenix, AZ (US)

(72) Inventors: Keiji Amemiya, Saitama-ken (JP); Yasuaki Hayashi, Gunma-ken (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 199 days.

(21) Appl. No.: 13/897,806

(22) Filed: May 20, 2013

(65) Prior Publication Data
US 2013/0314032 A1 Nov. 28, 2013

(30) Foreign Application Priority Data
May 24, 2012 (JP) .................................. 2012-118970

(51) Int. Cl.
*H02J 7/00* (2006.01)

(52) U.S. Cl.
CPC .............. *H02J 7/007* (2013.01); *H02J 7/0077* (2013.01); *H02J 2007/0059* (2013.01)

(58) Field of Classification Search
CPC ....................................................... Y02E 60/12

USPC ........................................................... 320/107
See application file for complete search history.

(56) References Cited

U.S. PATENT DOCUMENTS

2012/0139479 A1* 6/2012 Yun ................................ 320/107
2012/0139494 A1* 6/2012 Kim ............................... 320/128

FOREIGN PATENT DOCUMENTS

JP 2011-062022 A 3/2011

* cited by examiner

*Primary Examiner* — Edward Tso
*Assistant Examiner* — Ahmed Omar (57) ABSTRACT

A charge control circuit includes a comparator circuit to compare a secondary-battery voltage with a comparison voltage corresponding to an input-power-supply voltage, a transistor to supply an input current to an inductor, a first control circuit to control the transistor, and a second control circuit to control second and third transistors to increase and decrease an inductor current, respectively, so that a boost DC-DC converter performs a boost operation. When the secondary-battery voltage is equal to or higher than the comparison voltage, the first and second control circuits turn on the transistor and perform switching of the second and third transistors complementarily, respectively. When the secondary-battery voltage is lower than the comparison voltage, the first control circuit controls the transistor so that the input current takes a predetermined value, and the second control circuit turns on and off the third and second transistors, respectively.

20 Claims, 7 Drawing Sheets

CHARGE CONTROL CIRCUIT, CHARGE CIRCUIT, AND MOBILE ELECTRONIC DEVICE

CROSS-REFERENCE TO RELATED APPLICATION

This application claims the benefit of priority to Japanese Patent Application No. 2012-118970, filed May 24, 2012, of which full contents are incorporated herein by reference.

BACKGROUND OF THE INVENTION

1. Field of the Invention

The present invention relates to a charge control circuit, a charge circuit, and a mobile electronic device.

2. Description of the Related Art

Recent years, charging systems which perform charging via USB (Universal Serial Bus) interfaces are broadly adopted as those for mobile electronic devices including a secondary battery, such as a portable music player. For example, Japanese Laid-Open Patent Publication No. 2011-62022 discloses a charge circuit that converts electric power supplied from a power supply such as a USB power supply into electric power for charging a secondary battery such as a lithium-ion secondary battery using a DC-DC converter, and performs constant-current charging or constant-voltage charging.

By the way, an electronic device such as a digital video camera which requires higher power supply voltage may include two-cell lithium-ion secondary batteries (for example, full charge voltage of 8.4 volts). However, in the charge circuit of Japanese Laid-Open Patent Publication No. 2011-62022, the voltage (e.g., 8.4 volts) for charging two-cell lithium-ion secondary batteries cannot be generated from the USB power supply voltage of about 5 volts since a step-down DC-DC converter is employed.

SUMMARY OF THE INVENTION

A charge control circuit of a charge circuit, which is configured to convert electric power supplied from an input power supply into electric power for charging a secondary battery, and output the electric power for charging the secondary battery, according to an aspect of the present invention, the charge control circuit includes: a first comparator circuit configured to compare a voltage of the secondary battery with a first comparison voltage corresponding to a voltage of the input power supply; a first transistor connected to the input power supply, the first transistor configured to supply an input current to an inductor of a boost DC-DC converter; a first control circuit configured to control the first transistor; and a second control circuit configured to control a second transistor configured to increase an inductor current flowing through the inductor and a third transistor configured to decrease the inductor current so that the boost DC-DC converter performs a boost operation, the first control circuit configured to turn on the first transistor, and the second control circuit configured to perform switching of the second transistor and the third transistor in a complementary manner, and cause the boost DC-DC converter to perform the boost operation, when the voltage of the secondary battery is equal to or higher than the first comparison voltage; and the first control circuit configured to control the first transistor so that the input current takes a predetermined value, and the second control circuit configured to turn off the second transistor and turn on the third transistor, when the voltage of the secondary battery is lower than the first comparison voltage.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

First Embodiment

===Configuration of Charge Circuit===

Hereinafter, a description will be given of a configuration of a charge circuit according to a first embodiment of the present invention, with reference to FIG. 1.

Figure 1:
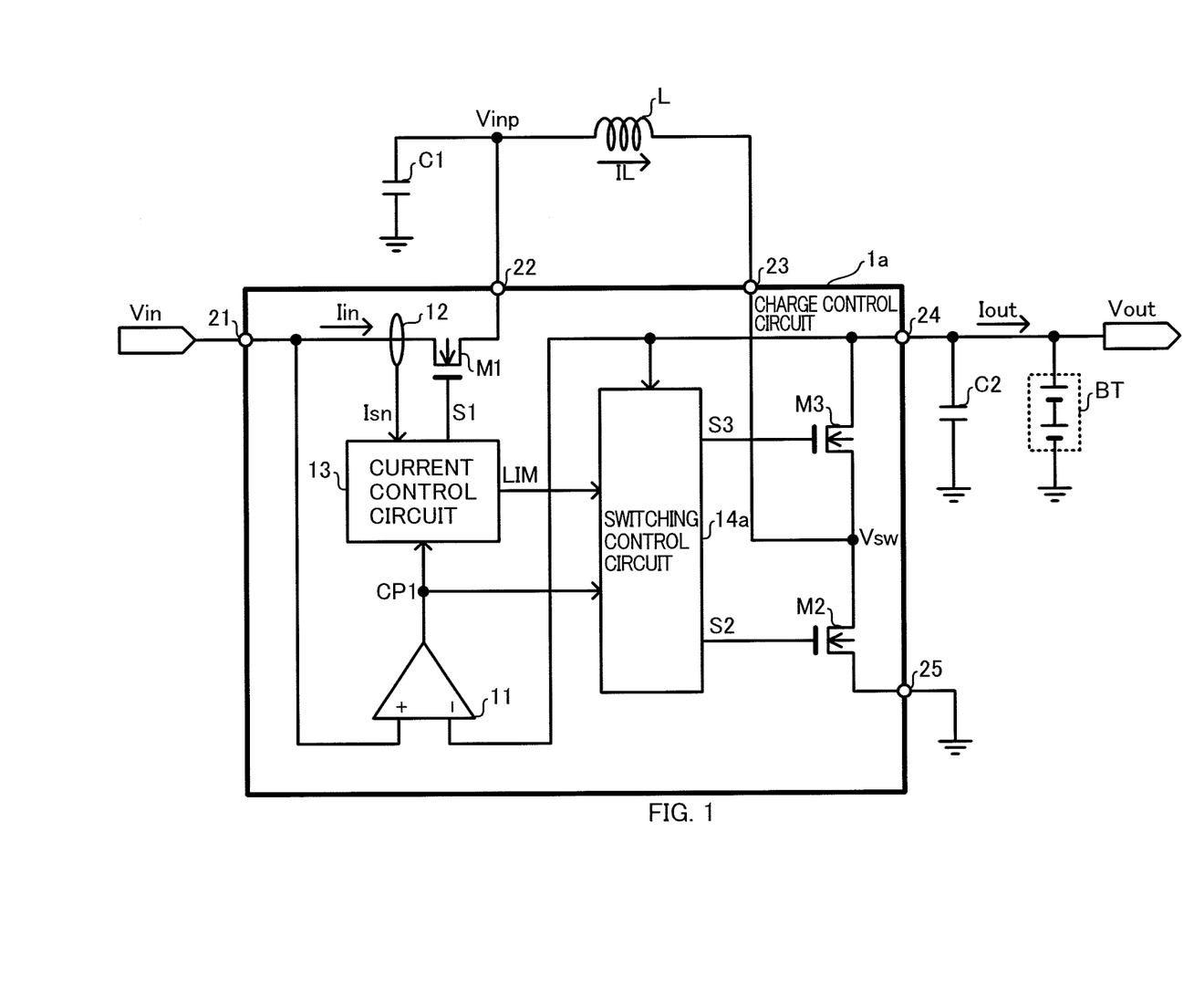
FIG. 1 is a circuit block diagram illustrating a configuration of a charge circuit according to a first embodiment of the present invention.

The charge circuit depicted in FIG. 1 is a circuit that converts electric power (input voltage Vin) supplied from an input power supply into electric power (output voltage Vout) for charging a secondary battery BT and outputs the electric power, and includes a charge control circuit 1a, capacitors C1 and C2, and an inductor L. It is assumed here that a full charge voltage of the secondary battery BT is higher than the input voltage Vin, and as an example, the input power supply is a USB power supply and the input voltage Vin is about 5 volts (4.75 volts to 5.25 volts), while the secondary battery BT is a two-cell lithium-ion secondary battery and the full charge voltage thereof is 8.4 volts.

The charge control circuit 1a is configured as an integrated circuit including a comparator circuit 11, a current detection circuit 12, a current control circuit 13, a switching control circuit 14a, and transistors M1 to M3 and provided with terminals 21 to 25. Hereinafter, as an example, a description will be given of the case where all of the transistors M1 to M3 are NMOS (N-channel Metal-Oxide Semiconductor) transistors.

The terminal 21 is an input terminal connected to the input power supply, and the terminal 24 is an output terminal connected to the secondary battery BT. Further, the non-inverting input of the comparator circuit 11 (first comparator circuit) is connected to the input terminal 21 and applied with the input voltage Vin, and the inverting input thereof is connected to the output terminal 24 and applied with the output voltage Vout. Then, a comparison result signal CP1 outputted from the comparator circuit 11 is inputted to the current control circuit 13 (first control circuit) and the switching control circuit 14a (second control circuit).

The drain of the transistor M1 (first transistor) is connected to the input terminal 21 and applied with the input voltage Vin, and the source thereof is connected to the terminal 22. Further, a detection signal Isn is inputted from the current detection circuit 12 to the current control circuit 13, and a control signal S1 outputted from the current control circuit 13 is inputted to the gate of the transistor M1. Furthermore, a current limiting signal LIM is inputted from the current control circuit 13 to the switching control circuit 14a.

The capacitors C1 and C2, the inductor L, and the transistors M2 and M3 configure a boost DC-DC converter. Note that the transistors M2 and M3 may be external components.

One end of the input-side capacitor C1 is connected to one end of the inductor L, and the connection point therebetween is connected to the source of the transistor M1 via the terminal 22. Further, the other end of the capacitor C1 is grounded, and the other end of the inductor L is connected to the terminal 23.

The drain of the transistor M2 (second transistor) is connected to the source of the transistor M3 (third transistor), and the connection point therebetween is connected to the other end of the inductor L via the terminal 23. Further, the source of the transistor M2 is grounded via the terminal 25, and the drain of the transistor M3 is connected to the output terminal 24. Further, one end of the output side capacitor C2 is connected to the drain of the transistor M3 via the output terminal 24, and the other end thereof is grounded. A voltage at the output terminal 24 (output voltage Vout) is inputted to the switching control circuit 14a, and control signals S2 and S3 outputted from the switching control circuit 14a are inputted to the gates of the transistors M2 and M3, respectively.

===Configuration of Switching Control Circuit===

Hereinafter, a description will be given of a configuration of the switching control circuit according to an embodiment of the present invention, with reference to FIG. 2.

Figure 2:
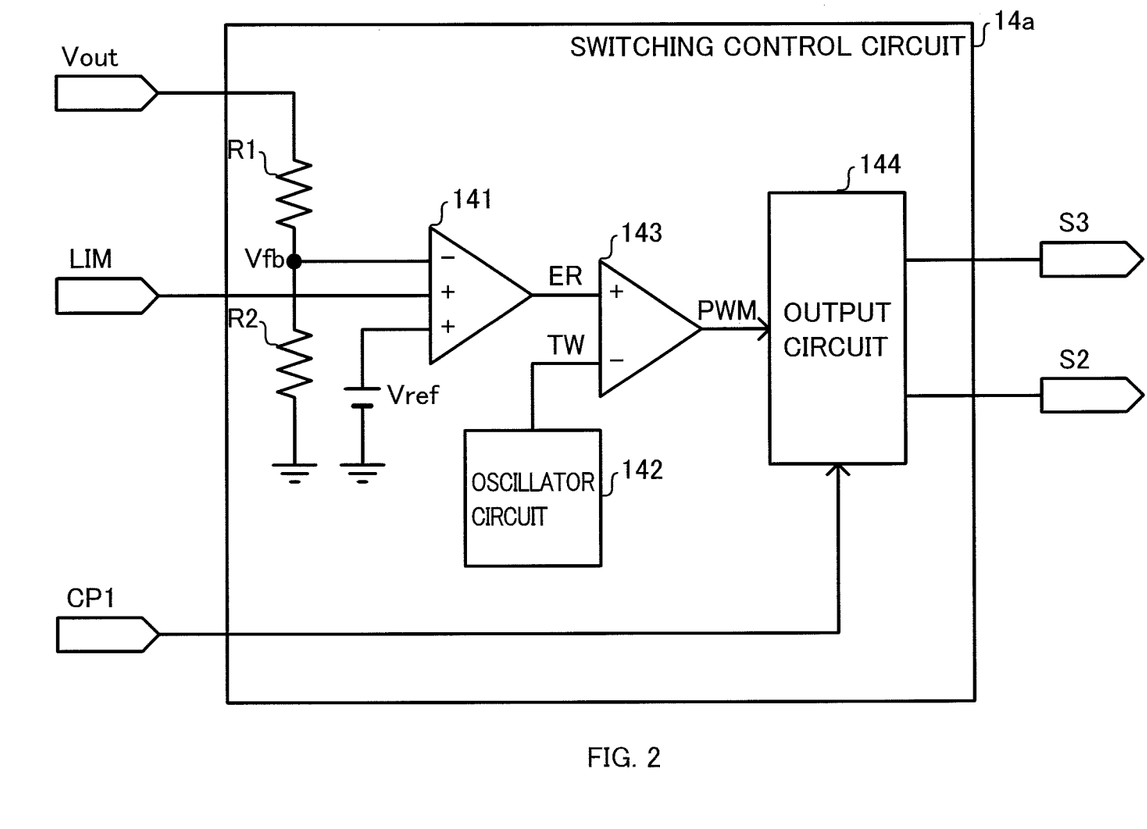
FIG. 2 is a circuit block diagram illustrating a configuration of a switching control circuit according to a first embodiment of the present invention.

The switching control circuit 14a depicted in FIG. 2 includes an error amplifier 141, an oscillator circuit 142, a PWM (Pulse Width Modulation) comparator 143, an output circuit 144, and resistors R1 and R2.

The resistors R1 and R2 are connected in series. Further, one end of the resistor R1 is applied with the output voltage Vout, and one end of the resistor R2 is grounded.

The error amplifier 141 includes one inverting input and two non-inverting inputs. Further, a feedback voltage Vfb obtained by voltage-dividing the output voltage Vout with the resistors R1 and R2 is applied to the inverting input of the error amplifier 141, a reference voltage Vref is applied to the first non-inverting input, and the current limiting signal LIM is inputted to the second non-inverting input. An error signal ER is outputted from the error amplifier 141.

A triangular wave TW is outputted from the oscillator circuit 142. The error signal ER is inputted to the non-inverting input of the PWM comparator 143, the triangular wave TW is inputted to the inverting input thereof, and a PWM signal is outputted from the PWM comparator 143. The PWM signal and the comparison result signal CP1 are inputted to the output circuit 144, and the control signals S2 and S3 are outputted from the output circuit 144. Note that another ramp wave such as a sawtooth wave may be inputted in place of the triangular wave TW from the oscillator circuit 142 to the inverting input of the PWM comparator 143.

===Operation of Charge Circuit===

Hereinafter, a description will be given of an operation of the charge circuit according to an embodiment of the present invention.

The comparator circuit 11 compares a voltage (output voltage Vout) of the secondary battery BT with a voltage (input voltage Vin) of the input power supply, and the comparison result signal CP1 goes high when Vout<Vin. The charge control circuit 1a switches an operation mode according to the comparison result signal CP1.

First, a description will be given of an operation in the case where the comparison result signal CP1 is high (Vout<Vin). Hereinafter, the operation mode in this case is referred to as a constant current mode.

When the input power supply is connected to the input terminal 21 in the state where the secondary battery BT having a voltage lower than the voltage (e.g., 5V) of the input power supply is connected to the output terminal 24, electric power from the input power supply starts to be supplied, thereby starting the charge control circuit 1a. At this time, since Vout<Vin, the operation mode of the charge control circuit 1a enters the constant current mode in response to the high level comparison result signal CP1.

When the charge control circuit 1a is started in the constant current mode, firstly the current control circuit 13 turns off the transistor M1, and the output circuit 144 of the switching control circuit 14a turns off the transistor M2 and turns on the transistor M3. Thus, the capacitor C1 is connected to the secondary battery BT via the inductor L and the transistor M3, and is charged up to the voltage of the secondary battery BT. That is, the voltage at the terminal 22 results in Vinp=Vout. Note that even in the case where the secondary battery BT has been completely discharged, Vinp=Vout is satisfied even though the capacitor C1 is not charged.

After the capacitor C1 is charged up to the voltage of the secondary battery BT resulting in Vinp=Vout, the current control circuit 13 controls the transistor M1 so that an input current Iin flowing through the transistor M1 has the predetermined value (e.g., about 100 mA).

More specifically, the current detection circuit 12 outputs the detection signal Isn corresponding to the input current Iin using a current sense resistor and a current mirror circuit, and the current control circuit 13 outputs the control signal S1 so that the input current Iin has the predetermined value, based on the detection signal Isn. Then, the input current Iin controlled at the predetermined value is outputted from the output terminal 24 via the inductor L and transistor M3, and the secondary battery BT is constant-current charged.

As such, in the constant current mode, since the capacitor C1 is firstly charged until Vinp=Vout is satisfied when starting up, the source voltage of the transistor M1 does not greatly change even though constant current control of the transistor M1 is started and allowing the input current Iin start to flow thereafter. Therefore, the source voltage of the transistor M1 is prevented from changing rapidly due to the capacitor C1 being charged immediately after the input current Iin starts to flow.

Note that a circuit for detecting Vinp=Vout may be provided, but instead, constant current control of the transistor M1 may be started after the elapse of a predetermined period of time sufficient to charge the capacitor C1 from 0 volts to the output voltage Vout (or the input voltage Vin which is the maximum value of the output voltage Vout in the constant current mode).

Next, a description will be given of an operation in the case where the comparison result signal CP1 is low (Vout≥Vin). Hereinafter, the operation mode in this case is referred to as the boost mode.

When the input power supply is connected to the input terminal 21 while the secondary battery BT having a voltage equal to or higher than the voltage (e.g., 5V) of the input power supply is in a state connected to the output terminal 24, electric power from the input power supply starts to be supplied, thereby starting the charge control circuit 1a. At this time, since Vout≥Vin, the operation mode of the charge control circuit 1a enters the boost mode in response to the low comparison result signal CP1.

When the charge control circuit 1a is started in the boost mode, firstly the output circuit 144 of the switching control circuit 14a turns off the transistors M2 and M3, and the current control circuit 13 turns on the transistor M1. Thus, the capacitor C1 is connected to the input power supply via the transistor M1, and is charged up to the input voltage Vin with the input current Iin flowing through the transistor M1. That is, the voltage at the terminal 22 results in Vinp=Vin.

After the capacitor C1 is charged up to the input voltage Vin resulting in Vinp=Vin, the switching control circuit 14a performs switching of the transistor M2 and the transistor M3 in a complementary manner, and causes the boost DC-DC converter to start a boost operation.

More specifically, the error amplifier 141 amplifies an error between the feedback voltage Vfb and the lower of the reference voltage Vref and the voltage (current limiting voltage) of the current limiting signal LIM, and generates an error signal ER, and the PWM comparator 143 compares the error signal ER and the triangular wave TW, and generates a PWM signal. Then, the output circuit 144 outputs the control signals S2 and S3 based on the PWM signal, and turns on the transistor M2 as well as turns off the transistor M3 during the first period, and turns off the transistor M2 and turns on the transistor M3 during the second period.

Thus, during the first period, the inductor L is connected to the ground via the transistor M2, the inductor current IL being increased, and energy stored. Further, during the second period, the inductor L is connected to the output terminal 24 via the transistor M3, the inductor current IL being decreased, and the energy stored during the first period released. Thereby, the boost operation is controlled by repeating the first period and the second period in an alternate manner, while the input current Iin is being supplied to the inductor L via the transistor M1.

As such, when starting up in the boost mode, the capacitor C1 is firstly charged until Vinp=Vin is satisfied, and thereafter, an output voltage. Vout higher than the input voltage Vin is generated by the boost operation of the boost DC-DC converter to be outputted from the terminal 24.

Note that the reference voltage Vref corresponding to the full charge voltage (e.g., 8.4 volts) of the secondary battery BT is applied to the first non-inverting input of the error amplifier 141, and the current limitation signal LIM corresponding to the detection signal Isn (input current Iin) is inputted to the second non-inverting input thereof. Thus, charging of the secondary battery BT in the boost mode is performed by the constant-current charge based on the current limitation signal LIM until the output voltage Vout reaches the full charge voltage (the feedback voltage Vfb reaches the reference voltage Vref), and is performed by the constant-voltage charge based on the reference voltage Vref when the output voltage Vout reaches the full charge voltage.

Further, a circuit for detecting Vinp=Vin may be provided, but instead, a boost operation of the boost DC-DC converter may be started after the elapse of a predetermined period of time sufficient to charge the capacitor C1 from 0 volts to the input voltage Vin.

As described above, in the charge circuit according to an embodiment of the present invention, the voltage (output voltage Vout) of the secondary battery BT is compared with the voltage (input voltage Vin) of the input power supply, and when Vout<Vin, the input current Iin is outputted while being controlled at the predetermined value, thereby constant-current charging the secondary battery BT. Further, when Vout≥Vin, the input voltage Vin is boosted to generate an output voltage Vout, and the secondary battery BT is constant-current charged until the output voltage Vout reaches the full charge voltage, while the secondary battery BT is constant-voltage charged when the output voltage Vout reaches the full charge voltage.

Note that the input voltage Vin in the case where the input power supply is a USB power supply can be changed within a range of 4.75 volts to 5.25 volts. Further, in the case where the output voltage Vout is supplied to a load in addition to the secondary battery BT, the output voltage Vout becomes liable to change depending on the state of the load. Thus, the comparator circuit 11 does not directly compare the output voltage Vout with the input voltage Vin, but may compare the output voltage Vout with one or more comparison voltages (first comparison voltage) corresponding to the input voltage Vin taking into consideration the fluctuation in these voltages and further the accuracy of the comparison and the like. For example, the boost mode may be entered in the case where the output voltage Vout is equal to or higher than the comparison voltage slightly lower than the input voltage Vin.

Second Embodiment

===Configurations of Charge Circuit and Switching Control Circuit===

Hereinafter, a description will be given of a configuration of a charge circuit and a switching control circuit according to a second embodiment of the present invention, with reference to FIG. 3 and FIG. 4.

Figure 3:
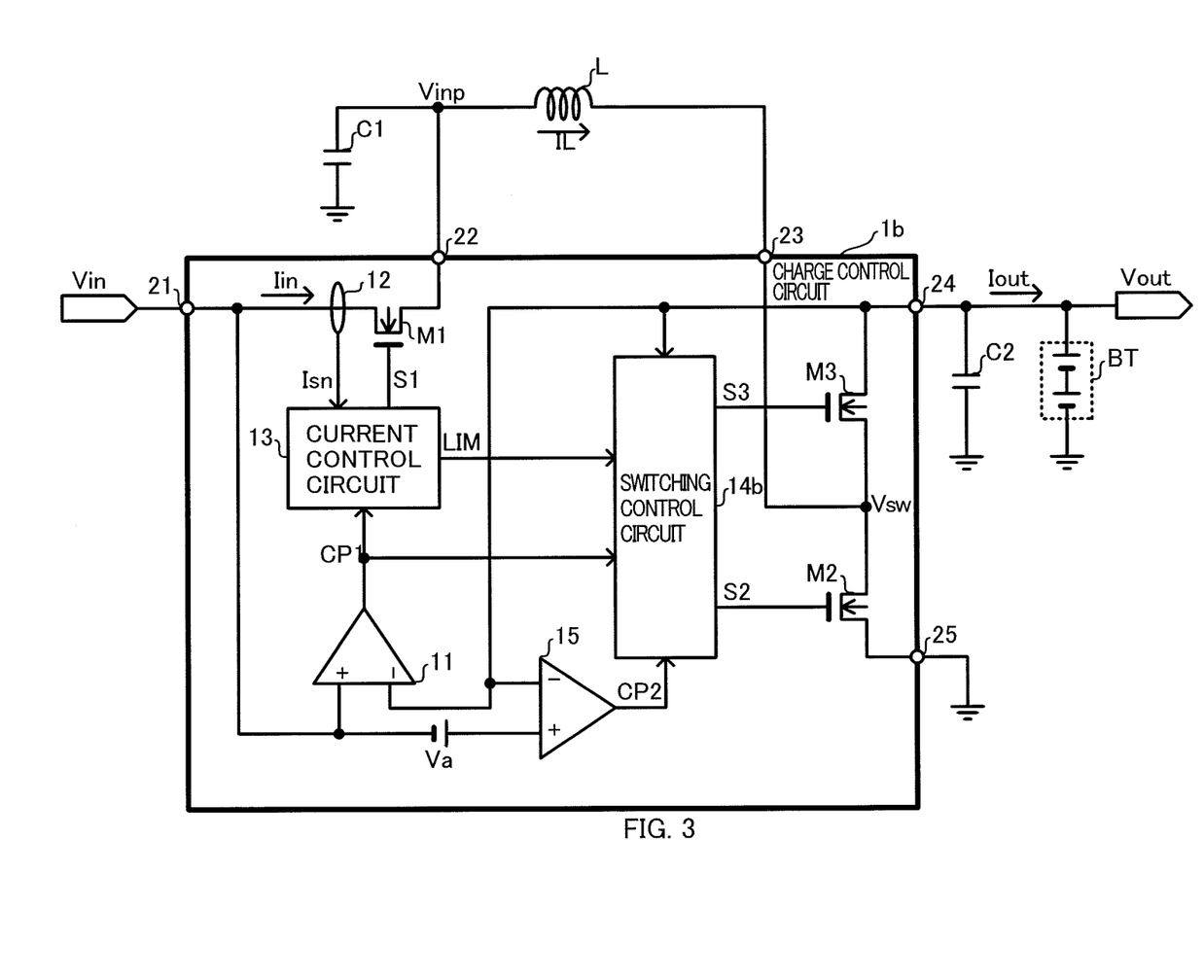
FIG. 3 is a circuit block diagram illustrating a configuration of a charge circuit according to a second embodiment of the present invention.
Figure 4:
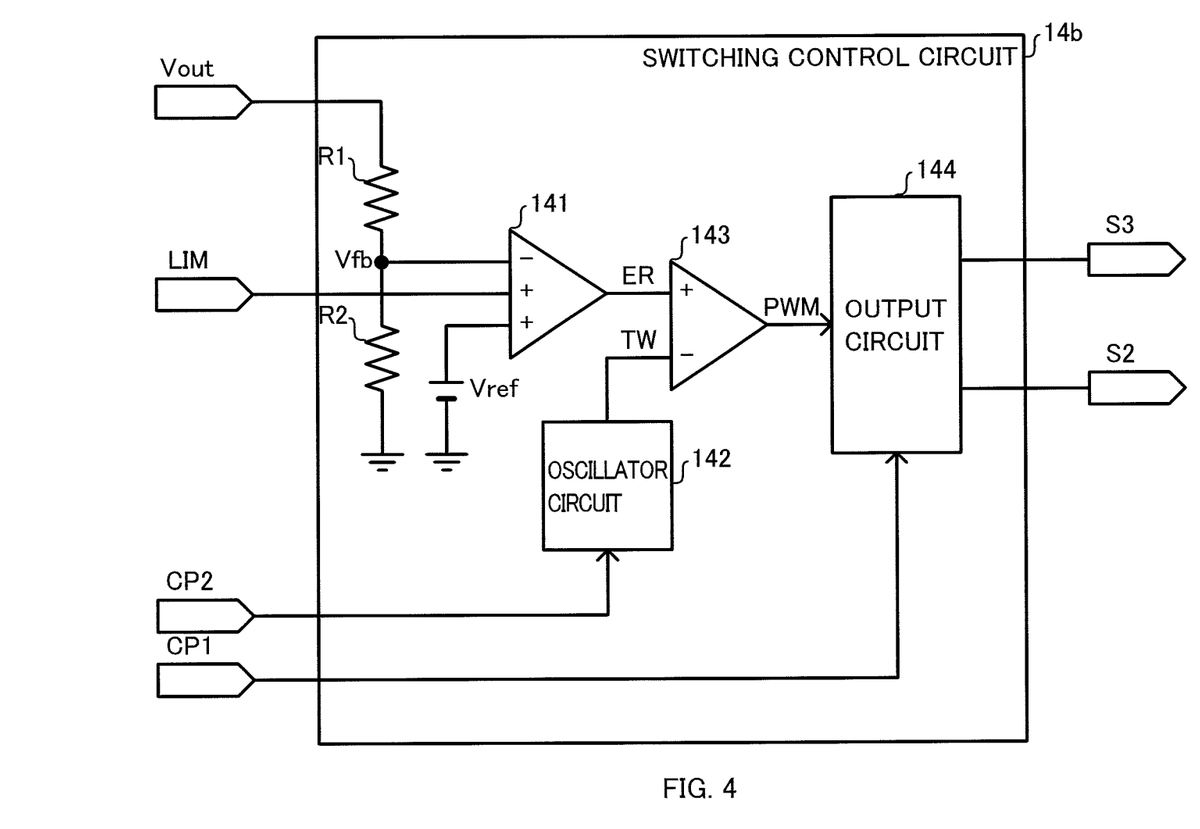
FIG. 4 is a circuit block diagram illustrating a configuration of a switching control circuit according to a second embodiment of the present invention.

The charge circuit depicted in FIG. 3 includes a charge control circuit 1b in place of the charge control circuit 1a, with respect to the charge circuit according to the first embodiment of the present invention. Further, the charge control circuit 1b includes a switching control circuit 14b in place of the switching control circuit 14a and further includes a comparator circuit 15, with respect to the charge control circuit 1a.

The non-inverting input of the comparator circuit 15 (second comparator circuit) is applied with a voltage Vin+Va (second comparison voltage) higher than the input voltage Vin by the predetermined voltage Va, and the inverting input thereof is connected to the output terminal 24 and applied with the output voltage Vout. Then, as depicted in FIG. 4, a comparison result signal CP2 outputted from the comparator circuit 15 is inputted to the oscillator circuit 142 of the switching control circuit 14b. Note that in the case where the comparator circuit 11 compares the output voltage Vout with the first comparison voltage corresponding to the input voltage Vin, the second comparison voltage is a voltage higher than the first comparison voltage, as well as higher than the input voltage Vin by the predetermined voltage Va.

===Operation of Charge Circuit===

Figure 5:
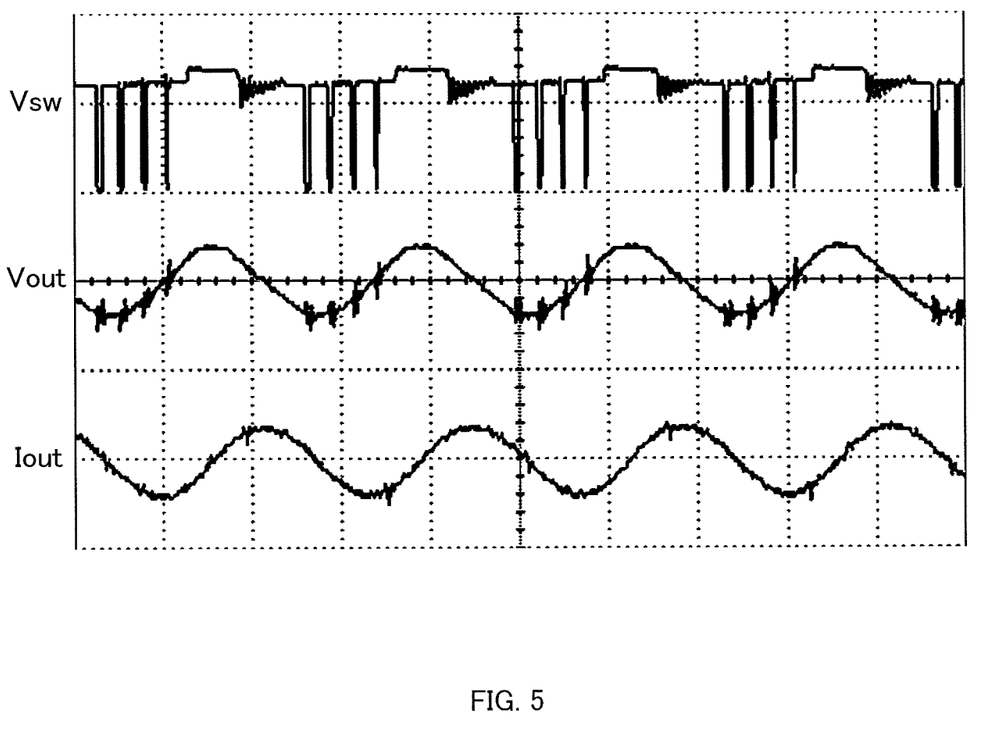
FIG. 5 is a diagram illustrating an example of a voltage Vsw at a terminal 23, an output voltage Vout, and an output current Iout when Vout≈Vin in a boost mode according to a first embodiment of the present invention.
Figure 6:
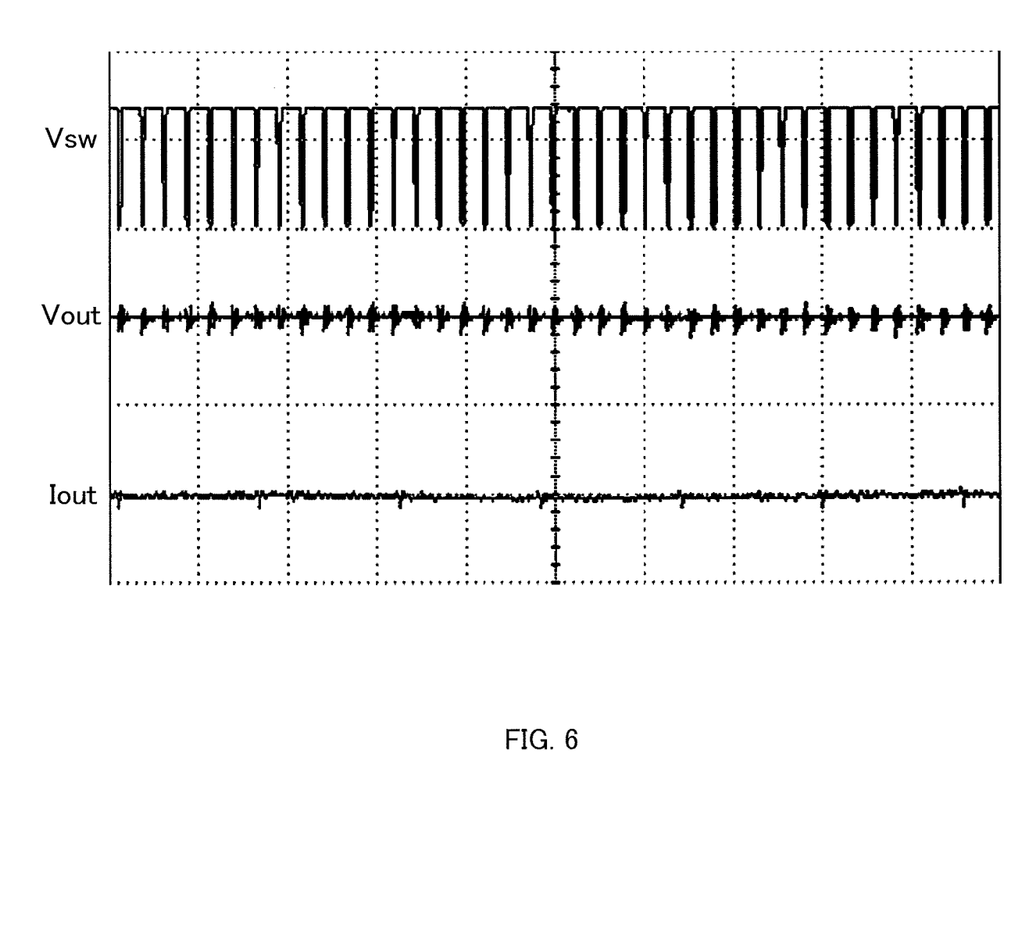
FIG. 6 is a diagram illustrating an example of a voltage Vsw at a terminal 23, an output voltage Vout, and an output current Iout when Vin≤Vout<Vin+V in a boost mode according to a second embodiment of the present invention.

Hereinafter, a description will be given of an operation of the charge circuit according to an embodiment of the present invention, with reference to FIG. 5 and FIG. 6 as appropriate. Note that, in the embodiment of the present invention, the operation of the charge circuit in the constant current mode is similar to that of the charge circuit according to the first embodiment of the present invention.

As described above, in the charge circuit according to the first embodiment of the present invention, the operation mode of the charge control circuit 1a is switched according to the comparison results between the voltage (output voltage Vout) of the secondary battery BT and the voltage (input voltage Vin) of the input power supply. Thus, the secondary battery BT is constant-current charged in the constant current mode, and when the output voltage Vout reaches the input voltage Vin, the mode is switched to the boost mode.

However, Vout≈Vin holds immediately after shifting from the constant current mode to the boost mode, thereby narrowing the duty width of the PWM signal. Thus, as depicted in FIG. 5 for example, switching of the transistors M2 and M3 based on the PWM signal would intermittently stop, thereby becoming liable to cause blocking oscillation. In order to suppress blocking oscillation, further charging of the secondary battery BT is required so that Vout≈Vin does not hold, whereby this state continues for some period of time.

Therefore, in an embodiment of the present invention, in the case where Vout≈Vin is satisfied when the constant current mode is shifted to the boost mode and the boost operation of the boost DC-DC converter is started, the gradient of the triangular wave TW outputted from the oscillator circuit 142 is steepened. More specifically, in the case where the comparison result signal CP1 is low and the comparison result signal CP2 is high, that is to say, when Vin≤Vout<Vin+Va, the charge current of the capacitor in the oscillator circuit 142 is increased, thereby steepening the gradient of the triangular wave TW. As a result, as depicted in FIG. 6 for example, the PWM comparator 143 can generate a PWM signal with a narrower duty width, thereby being able to suppress blocking oscillation.

Note that also in the case where Vout≈Vin is satisfied when starting up in the boost mode with Vinp=Vin being satisfied and starting the boost operation of the boost DC-DC converter, the gradient of the triangular wave TW is similarly steepened.

===Other Configuration Example of Switching Control Circuit===

In the aforementioned second embodiment, when Vin≤Vout<Vin+Va is satisfied in the boost mode, blocking oscillation is suppressed by steepening the gradient of the triangular wave TW outputted from the oscillator circuit 142, but it is not limited thereto. For example, as in the case of a switching control circuit 14c depicted in FIG. 7, blocking oscillation can be suppressed by inputting the comparison result signal CP2 to the output circuit 144, and fixing the transistor M3 to Off. More specifically, the control signal S3 is fixed to low, and transistor M3 is kept Off while Vin≤Vout<Vin+Va is satisfied in the boost mode.

Figure 7:
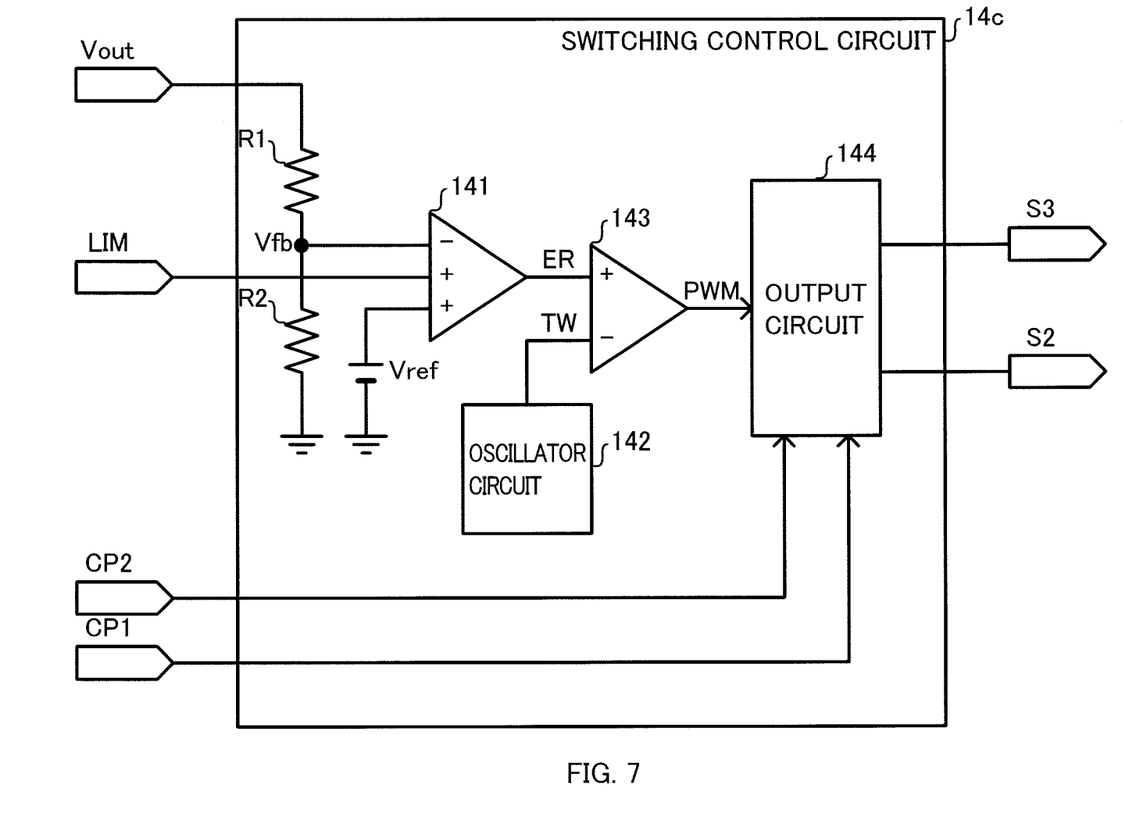
FIG. 7 is a circuit block diagram illustrating another configuration example of a switching control circuit.

Thus, the boost DC-DC converter performs the boost operation of the diode rectifier system using the switching-controlled transistor M2 and the body diode of the transistor M3 which is fixed to Off. As a result, when the transistor M2 is off, voltage Vsw at the terminal 23 is higher than the output voltage Vout by an amount of the forward drop voltage (e.g., about 0.7 volts) of the body diode, resulting to appear as if Vout≈Vin is not satisfied, thereby being able to suppress blocking oscillation.

Note that also in the case where Vout≈Vin is satisfied when starting up in the boost mode with Vinp=Vin being satisfied and starting the boost operation of the boost DC-DC converter, the transistor M3 is similarly fixed to Off.

Further, the method of suppressing blocking oscillation by steepening the gradient of the triangular wave TW (hereinafter, referred to as method 1) and the method of suppressing blocking oscillation by fixing the transistor M3 to Off (hereinafter, referred to as method 2) may be used in combination. Here, the USB 2.0 standard has the maximum supply capacity of 500 mA, and USB 3.0 standard has the maximum supply capacity of 900 mA. Thus, for example, method 1 is used in the case where the input current Iin is greater than 500 mA so that a large current does not flow through the body diode of the transistor M3. And, method 2 may be used instead of method 1 or in addition to method 1 in the case where the input current Iin is equal to or smaller than 500 mA.

Note that the aforementioned charge circuit is used for mobile electronic devices such as a digital still camera, a digital video camera, digital audio, and portable navigation.

As described above, in the charge control circuit 1b, the voltage (output voltage Vout) of the secondary battery BT is compared with the voltage (input voltage Vin) of the input power supply; and when Vout<Vin (constant current mode), the input current Iin flowing through the transistor M1 is outputted while being controlled at the predetermined value, and when Vout≥Vin (boost mode), switching of the transistor M2 and the transistor M3 is performed in a complementary manner while the input current Iin is being supplied to the inductor L of the boost DC-DC converter via the transistor M1; and thus the input voltage Vin is boosted, to generate and output the output voltage Vout, thereby being able to generate the output voltage Vout for charging the secondary battery BT whose full charge voltage is higher than the input voltage Vin. Further, the output voltage Vout is compared with the voltage Vin+Va higher than the input voltage Vin by a predetermined voltage Va, and when Vin≤Vout<Vin+Va, by steepening the gradient of the triangular wave TW which is compared with the error signal ER in the PWM comparator 143, the PWM signal with a narrower duty width can be generated when Vout≈Vin such as immediately after a shift from the constant current mode to the boost mode, thereby being able to suppress blocking oscillation.

Further, when Vin≤Vout<Vin+Va, by fixing the transistor M3 to Off and using the boost operation of the diode rectifier system in combination, blocking oscillation can be suppressed more reliably. Further, the boost operation of the diode rectifier system may be employed in combination according to the magnitude of the input current Iin so that a large current does not flow through the body diode of the transistor M3.

Further, as described above, in the charge circuit depicted in FIG. 3, in the constant current mode (Vout<Vin), the input current Iin flowing through the transistor M1 is outputted while being controlled at the predetermined value and the secondary battery BT is constant-current charged; and in the boost mode (Vout≥Vin), switching of the transistor M2 and the transistor M3 is performed in a complementary manner while the input current Iin is being supplied to the inductor L of the boost DC-DC converter via the transistor M1, and thus the input voltage Vin is boosted to generate the output voltage Vout and charge the secondary battery BT, thereby being able to charge the secondary battery BT whose full charge voltage is higher than the input voltage Vin. Further, when Vin≤Vout<Vin+Va, by steepening the gradient of the triangular wave TW which is compared with the error signal ER and generating the PWM signal with a narrower duty width, blocking oscillation can be suppressed when Vout≈Vin such as immediately after shifting from the constant current mode to the boost mode.

Further, as described above, when the switching control circuit 14c is used in place of the switching control circuit 14b in the charge control circuit 1b and when Vin≤Vout<Vin+Va is satisfied, by fixing the transistor M3 to Off and performing switching of only the transistor M2, the boost DC-DC converter is caused to perform the boost operation of the diode rectifier system and blocking oscillation can be suppressed, in the case where Vout≈Vin is satisfied such as immediately after a shift from the constant current mode to the boost mode.

Further, as described above, when the switching control circuit 14c is used in place of the switching control circuit 14b in the charge circuit depicted FIG. 3, and when Vin≤Vout<Vin+Va is satisfied, by fixing the transistor M3 to Off and performing switching of only the transistor M2 so that the boost DC-DC converter performs the boost operation of the diode rectifier system, blocking oscillation can be suppressed in the case where Vout≈Vin is satisfied such as immediately after a shift from the constant current mode to the boost mode.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A charge control circuit of a charge circuit configured to convert electric power supplied from an input power supply into electric power for charging a secondary battery, and output the electric power for charging the secondary battery, the charge control circuit comprising:
a first comparator circuit configured to compare a voltage of the secondary battery with a first comparison voltage corresponding to a voltage of the input power supply;
a first transistor connected to the input power supply, the first transistor configured to supply an input current to an inductor of a boost DC-DC converter;
a first control circuit configured to control the first transistor; and
a second control circuit configured to control a second transistor configured to increase an inductor current flowing through the inductor and a third transistor configured to decrease the inductor current so that the boost DC-DC converter performs a boost operation,
the first control circuit configured to turn on the first transistor, and
the second control circuit configured to perform switching of the second transistor and the third transistor in a complementary manner, and cause the boost DC-DC converter to perform the boost operation,
when the voltage of the secondary battery is equal to or higher than the first comparison voltage; and
the first control circuit configured to control the first transistor so that the input current takes a predetermined value, and
the second control circuit configured to turn off the second transistor and turn on the third transistor,
when the voltage of the secondary battery is lower than the first comparison voltage.

2. The charge control circuit according to claim 1 further comprising:
a second comparator circuit configured to compare the voltage of the secondary battery with a second comparison voltage higher than the first comparison voltage as well as higher than the voltage of the input power supply by a predetermined voltage, wherein
in a case where the voltage of the secondary battery is equal to or higher than the first comparison voltage,
the first control circuit turns on the first transistor, and
the second control circuit performs switching of the second transistor and the third transistor in a complementary manner and causes the boost DC-DC converter to perform a boost operation, when the voltage of the secondary battery is equal to or higher than the second comparison voltage; and turns off the third transistor, performs switching of only the second transistor, and causes the boost DC-DC converter to perform a boost operation, when the voltage of the secondary battery is lower than the second comparison voltage, and wherein
in a case where the voltage of the secondary battery is lower than the first comparison voltage,
the first control circuit controls the first transistor so that the input current takes the predetermined value, and
the second control circuit turns off the second transistor and turns on the third transistor.

3. The charge control circuit according to claim 1, wherein the second control circuit includes
an error amplifier configured to amplify an error between a feedback voltage corresponding to the voltage of the secondary battery and a lower voltage between a reference voltage corresponding to a full charge voltage of the secondary battery and a current limiting voltage corresponding to the input current, and generate an error signal,
an oscillator circuit configured to output a ramp wave,
a pulse-width modulation comparator configured to compare the error signal and the ramp wave, and generate a pulse-width modulation signal, and
an output circuit configured to control the second transistor and the third transistor based on the pulse-width modulation signal.

4. The charge control circuit according to claim 2, wherein the second control circuit includes
an error amplifier configured to amplify an error between a feedback voltage corresponding to the voltage of the secondary battery and a lower voltage between a reference voltage corresponding to a full charge voltage of the secondary battery and a current limiting voltage corresponding to the input current, and generate an error signal,
an oscillator circuit configured to output a ramp wave,
a pulse-width modulation comparator configured to compare the error signal and the ramp wave, and generate a pulse-width modulation signal, and
an output circuit configured to control the second transistor and the third transistor based on the pulse-width modulation signal.

5. The charge control circuit according to claim 4, wherein when the voltage of the secondary battery is lower than the second comparison voltage,
the oscillator circuit causes a gradient of the ramp wave to be steeper than a gradient of the ramp wave when the voltage of the secondary battery is equal to or higher than the second comparison voltage.

6. The charge control circuit according to claim 5, wherein the oscillator circuit is further configured to increase a charge current of a capacitor in the oscillator circuit, and steepens the gradient of the ramp wave.

7. The charge control circuit according to claim 3, wherein the ramp wave includes triangular wave.

8. The charge control circuit according to claim 4, wherein the ramp wave includes a triangular wave.

9. The charge control circuit according to claim 1, wherein the first to the third transistors include NMOS transistors, respectively.

10. The charge control circuit according to claim 1, wherein
the charge control circuit includes an integrated circuit.

11. A charge circuit configured to convert electric power supplied from an input power supply into electric power for charging a secondary battery, and output the electric power for charging the secondary battery, the charge circuit comprising:
a boost DC-DC converter;
a first comparator circuit configured to compare a voltage of the secondary battery with a first comparison voltage corresponding to a voltage of the input power supply;
a first transistor connected to the input power supply, the first transistor configured to supply an input current to an inductor of the boost DC-DC converter;
a first control circuit configured to control the first transistor; and
a second control circuit configured to control a boost operation of the boost DC-DC converter,
the boost DC-DC converter including
the inductor,
a second transistor configured to increase an inductor current flowing through the inductor,
a third transistor configured to decrease the inductor current,
an input-side capacitor connected to the inductor, and
an output-side capacitor connected to the third transistor;
the first control circuit configured to turn on the first transistor, and
the second control circuit configured to perform switching of the second transistor and the third transistor in a complementary manner, and cause the boost DC-DC converter to perform the boost operation,
when the voltage of the secondary battery is equal to or higher than the first comparison voltage; and
the first control circuit configured to control the first transistor so that the input current takes a predetermined value, and
the second control circuit configured to turn off the second transistor and turn on the third transistor,
when the voltage of the secondary battery is lower than the first comparison voltage.

12. The charge circuit according to claim 11 further comprising,
a second comparator circuit configured to compare the voltage of the secondary battery with a second comparison voltage higher than the first comparison voltage as well as higher than the voltage of the input power supply by a predetermined voltage, wherein
in a case where the voltage of the secondary battery is equal to or higher than the first comparison voltage,
the first control circuit turns on the first transistor, and
the second control circuit performs switching of the second transistor and the third transistor in a complementary manner and causes the boost DC-DC converter to perform a boost operation, when the voltage of the secondary battery is equal to or higher than the second comparison voltage; and turns off the third transistor, performs switching of only the second transistor, and causes the boost DC-DC converter to perform a boost operation, when the voltage of the secondary battery is lower than the second comparison voltage, and wherein
in a case where the voltage of the secondary battery is lower than the first comparison voltage,
the first control circuit controls the first transistor so that the input current takes the predetermined value, and
the second control circuit turns off the second transistor and turns on the third transistor.

13. The charge circuit according to claim 11, wherein
the second control circuit includes
an error amplifier configured to amplify an error between a feedback voltage corresponding to the voltage of the secondary battery and a lower voltage between a reference voltage corresponding to a full charge voltage of the secondary battery and a current limiting voltage corresponding to the input current, and generate an error signal,
an oscillator circuit configured to output a ramp wave,
a pulse-width modulation comparator configured to compare the error signal and the ramp wave, and generate a pulse-width modulation signal, and
an output circuit configured to control the second transistor and the third transistor based on the pulse-width modulation signal.

14. The charge circuit according to claim 12, wherein
the second control circuit includes
an error amplifier configured to amplify an error between a feedback voltage corresponding to the voltage of the secondary battery and a lower voltage between a reference voltage corresponding to a full charge voltage of the secondary battery and a current limiting voltage corresponding to the input current, and generate an error signal,
an oscillator circuit configured to output a ramp wave,
a pulse-width modulation comparator configured to compare the error signal and the ramp wave, and generate a pulse-width modulation signal, and
an output circuit configured to control the second transistor and the third transistor based on the pulse-width modulation signal.

15. The charge circuit according to claim 14, wherein
when the voltage of the secondary battery is lower than the second comparison voltage,
the oscillator circuit causes a gradient of the ramp wave to be steeper than a gradient of the ramp wave when the voltage of the secondary battery is equal to or higher than the second comparison voltage.

16. The charge circuit according to claim 15, wherein
the oscillator circuit is further configured to increase a charge current of a capacitor in the oscillator circuit, and steepens the gradient of the ramp wave.

17. The charge circuit according to claim 13, wherein
the ramp wave includes triangular wave.

18. The charge circuit according to claim 14, wherein
the ramp wave includes a triangular wave.

19. The charge circuit according to claim 11, wherein
the first to the third transistors include NMOS transistors, respectively.

20. A mobile electronic device including a charge circuit configured to convert electric power supplied from an input power supply into electric power for charging a secondary battery, and output the electric power for charging the secondary battery, the mobile electronic device comprising:
a boost DC-DC converter;
a first comparator circuit configured to compare a voltage of the secondary battery with a first comparison voltage corresponding to a voltage of the input power supply;

a first transistor connected to the input power supply, the first transistor configured to supply an input current to an inductor of the boost DC-DC converter;

a first control circuit configured to control the first transistor; and a second control circuit configured to control a boost operation of the boost DC-DC converter, wherein the boost DC-DC converter includes
   the inductor,
   a second transistor configured to increase an inductor current flowing through the inductor,
   a third transistor configured to decrease the inductor current,
   an input-side capacitor connected to the inductor, and
   an output-side capacitor connected to the third transistor, and the first control circuit configured to turn on the first transistor, and the second control circuit configured to perform switching of the second transistor and the third transistor in a complementary manner, and cause the boost DC-DC converter to perform the boost operation, when the voltage of the secondary battery is equal to or higher than the first comparison voltage; and the first control circuit configured to control the first transistor so that the input current takes a predetermined value, and the second control circuit configured to turn off the second transistor and turn on the third transistor, when the voltage of the secondary battery is lower than the first comparison voltage.

* * * * *